United States Patent
Kim

(10) Patent No.: US 7,031,552 B2
(45) Date of Patent: Apr. 18, 2006

(54) ADAPTIVE POST-FILTERING FOR REDUCING NOISE IN HIGHLY COMPRESSED IMAGE/VIDEO CODING

(75) Inventor: Changick Kim, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 725 days.

(21) Appl. No.: 10/244,071

(22) Filed: Sep. 13, 2002

(65) Prior Publication Data

US 2003/0190086 A1 Oct. 9, 2003

Related U.S. Application Data

(60) Provisional application No. 60/370,643, filed on Apr. 5, 2002.

(51) Int. Cl.
*G06K 9/40* (2006.01)

(52) U.S. Cl. .................. 382/275; 382/264; 375/240.29

(58) Field of Classification Search ............... 382/233, 382/250, 260, 261, 266, 264, 268, 275; 375/240.24, 375/240.27, 240.29, 243, 254; 358/463, 358/533
See application file for complete search history.

(56) References Cited

U.S. PATENT DOCUMENTS

| | | | |
|---|---|---|---|
| 5,454,051 A | 9/1995 | Smith | 382/268 |
| 5,818,964 A * | 10/1998 | Itoh | 382/205 |
| 5,819,035 A * | 10/1998 | Devaney et al. | 709/202 |
| 5,883,983 A | 3/1999 | Lee et al. | 382/268 |
| 5,937,101 A | 8/1999 | Jeon et al. | 358/426.04 |
| 5,969,604 A * | 10/1999 | Tice | 340/506 |
| 5,974,197 A | 10/1999 | Lee et al. | 382/268 |
| 6,028,967 A | 2/2000 | Kim et al. | 382/268 |
| 6,115,503 A | 9/2000 | Kaup | 348/606 |
| 6,151,420 A | 11/2000 | Wober et al. | 382/232 |
| 6,167,164 A | 12/2000 | Lee | 382/261 |
| 6,188,799 B1 | 2/2001 | Tan et al. | 382/260 |
| 6,226,050 B1 | 5/2001 | Lee | 368/607 |
| 6,229,929 B1 | 5/2001 | Lynch et al. | 382/268 |
| 6,240,135 B1 * | 5/2001 | Kim | 375/240.01 |
| 6,259,823 B1 | 7/2001 | Lee et al. | 382/268 |
| 6,285,801 B1 * | 9/2001 | Mancuso et al. | 382/268 |
| 6,304,678 B1 * | 10/2001 | Yang et al. | 382/268 |
| 6,317,522 B1 | 11/2001 | Rackett | 382/268 |
| 6,320,987 B1 | 11/2001 | Chu | 382/260 |
| 6,463,182 B1 * | 10/2002 | Onishi et al. | 382/261 |
| 6,633,638 B1 * | 10/2003 | De Trana et al. | 379/242 |
| 6,721,458 B1 * | 4/2004 | Ancin | 382/261 |
| 6,748,113 B1 * | 6/2004 | Kondo et al. | 382/232 |
| 2001/0003545 A1 | 6/2001 | Hong | 382/236 |
| 2001/0019634 A1 | 9/2001 | Lainema et al. | 382/275 |

FOREIGN PATENT DOCUMENTS

WO    WO 00/33254    6/2000

* cited by examiner

*Primary Examiner*—Sheela Chawan
(74) *Attorney, Agent, or Firm*—Michael T. Gabrik

(57) ABSTRACT

A technique to reduce ringing artifacts in highly compressed block-based image/video coding is applied to each reconstructed frame output from the decoder. For each pixel block of a reconstructed frame, low-pass filtering is then adaptively applied according certain calculated differences between adjacent pixel values. For each pixel, a determination is made as to what type of horizontal filter, if any, is to be applied. Depending on the results of that determination, the pixel may remain unfiltered or may have a 2- or 3-tap horizontal filter applied to it. A similar process is undertaken to determine what type of vertical filter, if any, is to be applied, no filter, a 2-tap or a 3-tap vertical filter.

21 Claims, 4 Drawing Sheets

US 7,031,552 B2

ADAPTIVE POST-FILTERING FOR REDUCING NOISE IN HIGHLY COMPRESSED IMAGE/VIDEO CODING

CONTINUING APPLICATION DATA

This application claims the benefit under 35 U.S.C. §119(e) of U.S. provisional application Ser. No. 60/370,643, filed Apr. 5, 2002.

This application is related to U.S. application Ser. No. 10/037,767, filed Oct. 23, 2001 and to U.S. application Ser. No. 10/176,994, now U.S. Pat. No. 6,950,473, filed Jun. 21, 2002, the contents of which are incorporated by reference herein.

BACKGROUND OF THE INVENTION

1. Field of the Invention

This present invention relates to image data filtering, and more particularly to an improved algorithm for reducing ringing noise in image/video coding. The invention, which can be embodied in an apparatus, methods or programs of instructions, is particularly well suited for highly compressed image/video coding.

2. Description of the Related Art

Most of today's video coding standards, such as MPEG-4 of the International Organization for Standardization (ISO) and International Telecommunication Union (ITU) H.263, adopt block-based motion compensation and perform a discrete cosine transform (DCT) operation on the blocks. In the case of still image coding, using JPEG, the block-based DCT coding is also adopted. When an image is highly compressed, the block-based coding may cause blocking artifacts and ringing noise. A typical blocking artifact is grid noise in a homogeneous area in which adjacent pixels have relatively similar pixel values. Ringing noise, which is most noticeable near real edges, occurs as a result of Gibb's phenomenon due to the truncation of the high frequency coefficients by quantization. Ringing noise is also called "mosquito noise," as it often occurs at a boundary areas between a human skin regions and background, and thus visibly resembles mosquitoes flying around a person's head and shoulders.

OBJECTS AND SUMMARY OF THE INVENTION

Objects of the Invention

Thus, an object of the present invention is to provide an adaptive filtering method for reducing the ringing noise that occurs as a result of Gibb's phenomenon due to the truncation of the high frequency coefficients by quantization.

SUMMARY OF THE INVENTION

According to one aspect of this invention, a method for reducing ringing noise in a decompressed image or video is provided. The method comprises the steps of obtaining reconstructed frame blocks of the decompressed image or video (i.e., the blocks from the compressed bit stream); for each reconstructed frame block, selectively performing a first type of filtering (e.g., horizontal filtering) on each pixel of that reconstructed frame block based on certain relationships between that pixel and its left and right adjacent pixels, wherein, for each pixel of that block, a first filter (e.g., a first low-pass filter) is applied to perform the first type of filtering if a first condition is satisfied, a second filter (e.g., a second low-pass filter) is applied to perform the first type of filtering if the first condition is not satisfied but a second condition is satisfied. Also, for each reconstructed frame block, selectively performing a second type of filtering (e.g., vertical filtering) on each pixel of that reconstructed frame block based on certain relationships between that pixel and its upper and lower adjacent pixels, wherein, for each pixel of that block, the first filter is applied to perform the second type of filtering if a third condition is satisfied, the second filter is applied to perform the second type of filtering if the third condition is not satisfied but a fourth condition is satisfied.

Preferably, the first and second low-pass filters having a different number of taps.

The method may further comprise the step of calculating, for each pixel in that block, (i) the absolute difference between the value of that pixel and the value of its left adjacent pixel, and (ii) the absolute difference between the value of that pixel and the value of its right adjacent pixel, wherein the first condition is satisfied if both the difference in (i) and the difference in (ii) are each less than a predefined threshold, and the second condition is satisfied if one of the differences in (i) or (ii), but not both, is less than the predefined threshold. Preferably, if the difference in (i) is greater than or equal to the predefined threshold but the difference in (ii) is less than the predefined threshold, that pixel is averaged with its right adjacent pixel, and if the difference in (ii) is greater than or equal to the predefined threshold but the difference in (i) is less than the predefined threshold, that pixel is averaged with its left adjacent pixel.

The method may further comprise the step of calculating, for each pixel in that block, (i) the absolute difference between the value of that pixel and the value of its upper adjacent pixel, and (ii) the absolute difference between the value of that pixel and the value of its lower adjacent pixel, wherein the third condition is satisfied if both the difference in (i) and the difference in (ii) are each less than a predefined threshold, and the fourth condition is satisfied if one of the differences in (i) or (ii), but not both, is less than the predefined threshold. Preferably, if the difference in (i) is greater than or equal to the predefined threshold but the difference in (ii) is less than the predefined threshold, that pixel is averaged with its lower adjacent pixel, and if the difference in (ii) is greater than or equal to the predefined threshold but the difference in (i) is less than the predefined threshold, that pixel is averaged with its upper adjacent pixel.

In another aspect, the invention involves an apparatus for reducing ringing noise in a decompressed image or video. The apparatus comprises an input circuit configured to receive reconstructed frame blocks of the decompressed image or video (i.e., the blocks from the compressed bit stream); and processing circuitry configured to: selectively perform, for each reconstructed frame block, a first type of filtering on each pixel of that reconstructed frame block based on certain relationships between that pixel and its left and right adjacent pixels, wherein, for each pixel of that block, a first filter is applied to perform the first type of filtering if a first condition is satisfied, a second filter is applied to perform the first type of filtering if the first condition is not satisfied but a second condition is satisfied, and selectively perform, for each reconstructed frame block, a second type of filtering on each pixel of that reconstructed frame block based on certain relationships between that pixel and its upper and lower adjacent pixels, wherein, for each pixel of that block, the first filter is applied to perform the second type of filtering if a third condition is satisfied, the second filter is applied to perform the second type of filtering if the third condition is not satisfied but a fourth condition is satisfied.

The first type of filtering preferably comprises horizontal filtering and the second type of filtering comprises vertical filtering. Moreover, the first and second filters are preferably first and second low-pass filters respectively having a different number of taps.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
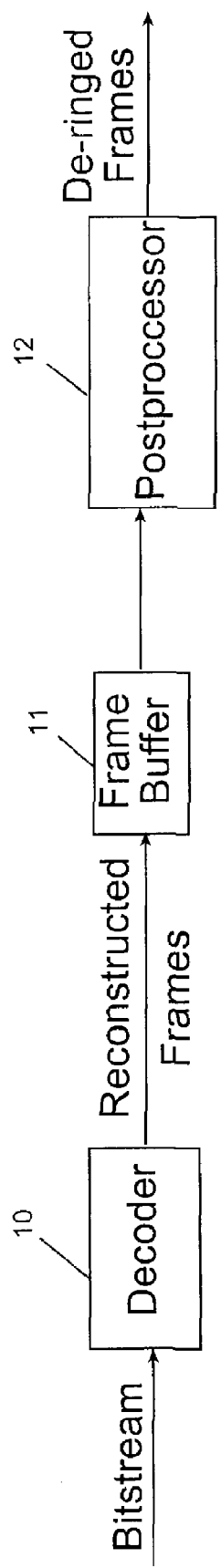
FIG. 1 is a block and functional diagram of the decoding pipeline and the relative position of the de-ringing algorithm of this invention in that pipeline.

The present invention provides a technique (e.g., an algorithm) to reduce ringing noise in highly compressed image/video coding. The technique uses adaptive filtering for reducing ringing noise in image/video data. For each reconstructed frame block (i.e., a pixel block), the algorithm adaptively filters select block regions based on certain calculated differences to reduce ringing artifacts. As illustrated in FIG. 1, the technique is applied to each reconstructed frame output from a decoder 10. The reconstructed frames from decoder 10 are stored in a frame buffer 11. Postprocessor 12 accesses the frames from frame buffer 11 and processes them in accordance with invention as described in detail below.

Figure 2:
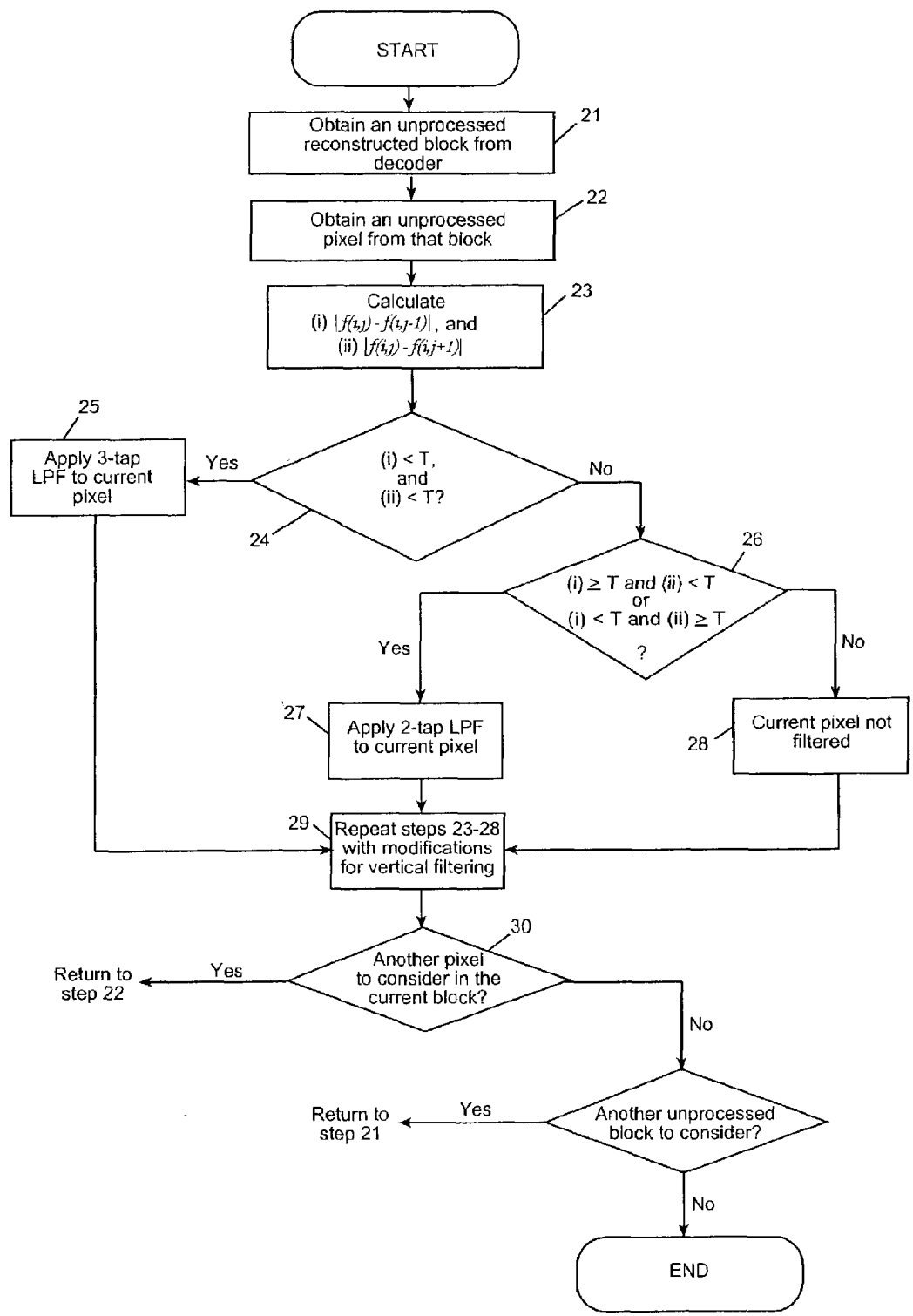
FIG. 2 is a flow chart illustrating certain process steps of the algorithm in accordance with embodiments of the invention.

A flow chart, shown in FIG. 2, describes the algorithm in accordance with embodiments of the invention. The algorithm starts as the reconstructed frame blocks of the digital input representation are obtained from the decoder (step 21). From that block, an unprocessed pixel is obtained (step 22) and processed. One of two types (i.e., different taps) of a low-pass filter (LPF) is applied to pixels of each reconstructed frame block on a block-by-block basis according to certain calculated pixel value differences. Thus, the filtering scheme is applied to pixels of each reconstructed frame block until all blocks have been processed.

Figure 3:
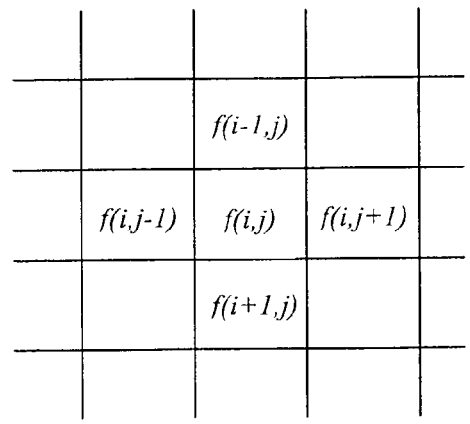
FIG. 3 is a schematic illustration of the location of pixels in an image or video frame, including a pixel f(i, j) which may be filtered in accordance with embodiments of the present invention.

For the current pixel, calculate (i) the absolute difference between the value of the current pixel f(i, j) and the value of its left adjacent pixel f(i, j−1) and (ii) the absolute difference between the value of the current pixel f(i, j) and the value of its right adjacent pixel f(i, j+1), to determine whether horizontal filtering should be performed, and if so, what type of horizontal filtering (step 23). The relative locations of the current pixel, the left adjacent pixel, the right adjacent pixel, as well as the top and bottom adjacent pixels, are shown in FIG. 3.

In step 24, it is determined if both the difference in (i) and the difference in (ii) are each less than a predefined threshold T. If so, a 3-tap LPF is applied to the current pixel in step 25. If the condition of step 24 is not satisfied, it is next determined in step 26 if one of the differences in (i) or (ii), but not both, is greater than or equal to the threshold. If so, a 2-tap LPF is applied to the current pixel in step 27. More specifically, if the difference in (i) is greater than or equal to the threshold but the difference in (ii) is less than the threshold, the current pixel is averaged with its right adjacent pixel using the 2-tap filter; similarly, if the difference in (ii) is greater than or equal to the threshold but the difference in (i) is less than the threshold, the current pixel is averaged with its left adjacent pixel using the 2-tap filter. No filtering is performed if neither the difference in (i) nor the difference in (ii) is less than the threshold, that is, if both of the differences are each greater than or equal to the threshold (step 28).

A process similar to that performed in steps 23–28 is performed to determine what type of vertical filtering, if any, should be performed. In this case, however, the value of the upper adjacent pixel f(i−1, j) is used in (i) instead of the left adjacent pixel value, and the value of the lower adjacent pixel f(i+1, j) is used in (ii) instead of the right adjacent pixel value. This processing is collectively represented by step 29.

Next, the algorithm determines whether there are any more unprocessed pixels in the current block (step 30). If so, the algorithm proceeds through the "yes" terminal of that decision block and returns to step 22 to obtain a new unprocessed pixel. If the decision in step 30 is "no," the algorithm proceeds to step 31 to determine if there are any more "unprocessed" pixel blocks. If so, the algorithm returns to step 21 to obtain the next block. If not, the algorithm ends.

The filter coefficients of the 3- and 2-tap LPFs used in the above-described process are as follows:

$$h_{3\text{-}tap}(n) = \frac{1}{4}\{1, 2, 1\} \quad \text{and} \quad h_{2\text{-}tap}(n) = \frac{1}{2}\{1, 1\}$$

Figure 4:
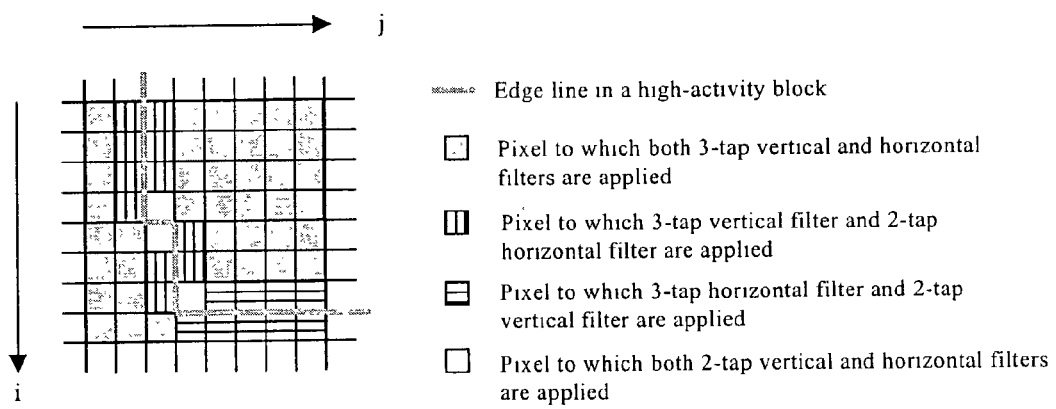
FIG. 4 is a schematic diagram illustrating pixels to which 3-and/or 2-tap low-pass filters are applied.

The specifics of the filtering process outlined in steps 22–28 in FIG. 2 can be further described as follows. First, let $DH_1$ be defined as the absolute difference between the current pixel value and its adjacent pixel value to the left, and $DH_2$ represent the absolute difference between the current pixel value and its right adjacent pixel value. Then, if both $DH_1$ and $DH_2$ are less than $k_2 \times QP$, the 3-tap horizontal filter is applied to the current pixel. If one or the other, but not both, of $DH_1$ or $DH_2$ is not less than $k_2 \times QP$, it is assumed that there is a real edge point and, thus the 2-tap horizontal averaging filter is applied to the current pixel and its adjacent pixel whose difference from the current pixel is less than $k_2 \times QP$. The 3-tap and 2-tap vertical filters are applied in the same way as the horizontal filters. The pictorial illustration for pixel positions to which horizontal and/or vertical filters are applied is set forth in FIG. 4. This process can be mathematically described as follows:

if $((DH_1 < k_2 \times QP)$ and $(DH_2 < k_2 \times QP))$,
then do 3-tap horizontal filtering,
else if $(((DH_1 < k_2 \times QP)$ and $(DH_2 \geq k_2 \times QP))$ or $((DH_1 \geq k_2 \times QP)$ and $(DH_2 < k_{\times QP})))$,
then do 2-tap horizontal filtering,
if $((DV_1 < k_2 \times QP)$ and $(DV_2 < k_2 \times QP))$,
then do 3-tap vertical filtering,
else if $(((DV_1 < k_2 \times QP)$ and $(DV_2 \geq k_2 \times QP))$ or $((DV_1 \geq k_2 \times QP)$ and $(DV_2 < k_{\times QP})))$,
then do 2-tap vertical filtering, where $DH_1 = |f(i, j) - f(i, j-1)|$ $DH_2 = |f(i, j) - f(i, j+1)|$ $DV_1 = |f(i, j) - f(i-1, j)|$ $DV_2 = |f(i, j) - f(i+1, j)|$ As the foregoing description demonstrates, the present invention provides an efficient de-ringing algorithm that is particularly applicable to highly compressed block-based image/video coding. This filtering scheme is quite effective in greatly reducing noticeably visible ringing noise around objects' boundaries. The algorithm is robust to different images and compression schemes. Moreover, because of its relatively simple architecture, the algorithm can be implemented in real-time applications such mobile video phone systems. The algorithm may be conveniently embodied in the form of software that can be used with an existing coding scheme, such as MPEG-4 and ITU-T H.263.

Figure 5:
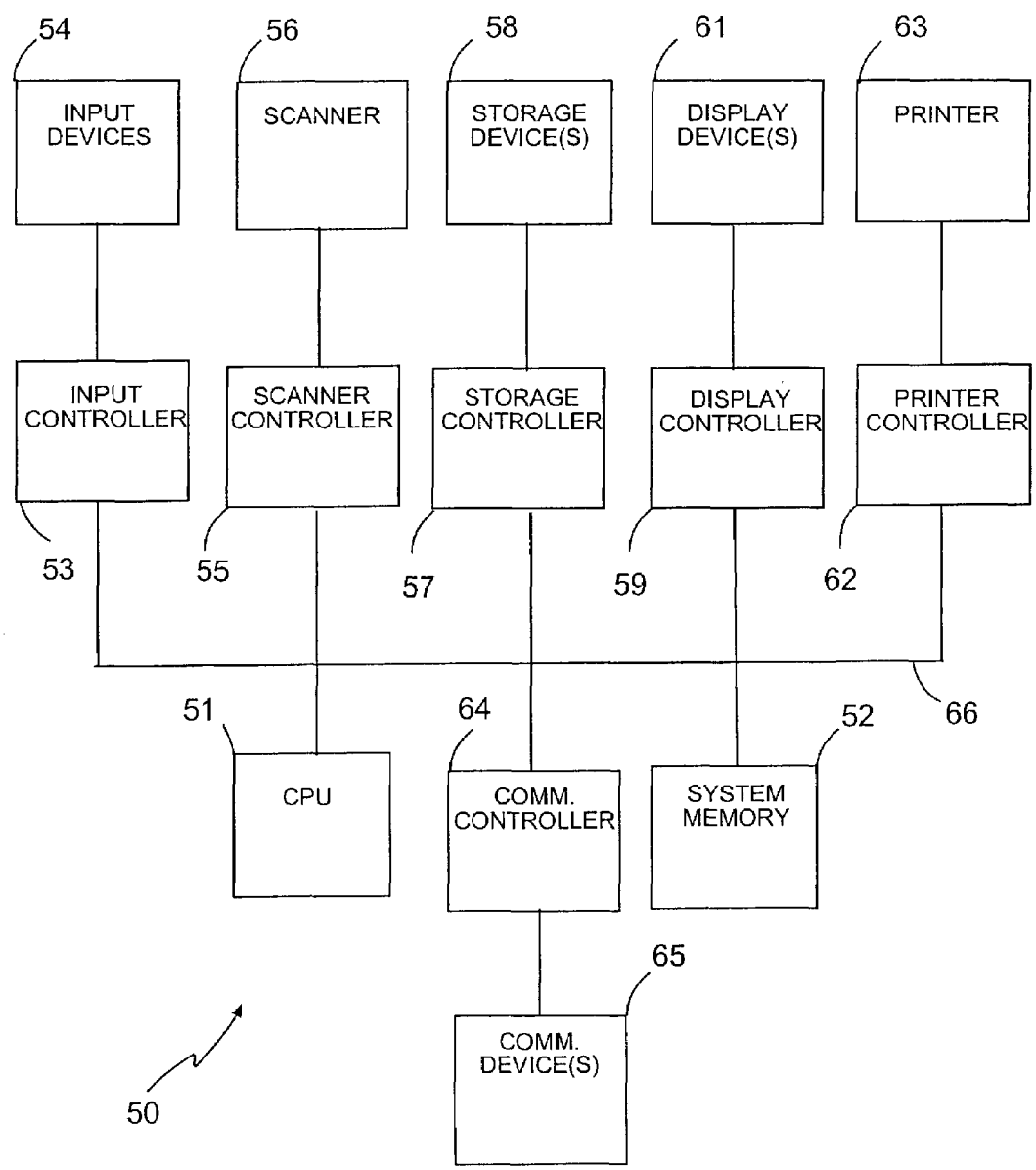
FIG. 5 is a block diagram illustrating components in an exemplary image processing system that may be used to implement aspects of the present invention.

FIG. 5 illustrates a typical system which may be used to "run" the de-ringing algorithm of the present invention. As illustrated in FIG. 5, system 50 includes a central processing unit (CPU) 51 that provides computing resources and controls the computer. CPU 51 may be implemented with a microprocessor or the like, and may also include a graphics processor and/or a floating point coprocessor for mathematical computations. System 50 further includes system memory 52 which may be in the form of random-access memory (RAM) and read-only memory (ROM).

A number of controllers and peripheral devices are also provided, as shown in FIG. 5. Input controller 53 represents an interface to one or more input devices 54, such as a keyboard, mouse, stylus or remote control. There is also a controller 55 which communicates with a scanner 56 or equivalent device for digitizing documents including images which may be processed in accordance with the invention. A storage controller 57 interfaces with one or more storage devices 58 each of which includes a storage medium such as magnetic tape or disk, or an optical medium that may be used to record programs of instructions for operating systems, utilities and applications which may include embodiments of programs that implement various aspects of the present invention. Storage device(s) 58 may also be used to store data to be processed in accordance with the invention. A display controller 59 provides an interface to a display device 61 which may be a cathode ray tube (CRT), thin film transistor (TFT) display, or video player. A printer controller 62 is also provided for communicating with a printer 63 for printing documents including images processed in accordance with the invention. A communications controller 64 interfaces with a communication device 65 which enables system 50 to connect to remote devices through any of a variety of networks including the Internet, a local area network (LAN), a wide area network (WAN), or through any suitable electromagnetic carrier signals including infrared signals.

In the illustrated embodiment, all major system components connect to bus 66 which may represent more than one physical bus. However, it should be noted that while all system components may typically be located in physical proximity to one another, such is not a requirement of the invention. For example, the input data (e.g., reconstructed frame(s)) and/or the output data (e.g., de-ringed frame(s)) may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. For example, a single ASIC can be fabricated that contains the appropriate hardware for performing the functions described herein. The "apparatus" term in the claims is intended to cover all such hardware implementations of the invention, as well as super-set devices, such as a computer or a system of the type shown in FIG. 5. Moreover, the individual "means" recitations are intended to cover any suitable component, in either hardware or software form, capable of performing the function recited, including a CPU, one or more ASICs, digital signal processing circuitry, or the like.

With these implementation alternatives in mind, it is to be understood that the block and flow diagrams show the performance of certain specified functions and relationships thereof. The boundaries of these functional blocks have been defined herein for convenience of description. Alternate boundaries may be defined so long as the specified functions are performed and relationships therebetween are appropriately maintained. The diagrams and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for reducing ringing noise in a decompressed image, comprising the steps of:
    obtaining reconstructed frame blocks of the decompressed image;
    for each reconstructed frame block, selectively performing a first type of filtering on each pixel of that reconstructed frame block based on certain relationships between that pixel and its left and right adjacent pixels, wherein, for each pixel of that block, a first filter is applied to perform the first type of filtering if a first condition is satisfied, a second filter is applied to perform the first type of filtering if the first condition is not satisfied but a second condition is satisfied; and for each reconstructed frame block, selectively performing a second type of filtering on each pixel of that reconstructed frame block based on certain relationships between that pixel and its upper and lower adjacent pixels, wherein, for each pixel of that block, the first filter is applied to perform the second type of filtering if a third condition is satisfied, the second filter is applied to perform the second type of filtering if the third condition is not satisfied but a fourth condition is satisfied.

2. The method of claim 1, wherein the first type of filtering comprises horizontal filtering and the second type of filtering comprises vertical filtering.

3. The method of claim 2, wherein the first filter is a first low-pass filter and the second filter is a second low-pass filter, the first and second low-pass filters having a different number of taps.

4. The method of claim 3, further comprising the step of:
calculating, for each pixel in that block, (i) the absolute difference between the value of that pixel and the value of its left adjacent pixel, and (ii) the absolute difference between the value of that pixel and the value of its right adjacent pixel, wherein the first condition is satisfied if both the difference in (i) and the difference in (ii) are each less than a predefined threshold, and the second condition is satisfied if one of the differences in (i) or (ii), but not both, is less than the predefined threshold.

5. The method of claim 4, wherein, if the difference in (i) is greater than or equal to the predefined threshold but the difference in (ii) is less than the predefined threshold, that pixel is averaged with its right adjacent pixel, and if the difference in (ii) is greater than or equal to the predefined threshold but the difference in (i) is less than the predefined threshold, that pixel is averaged with its left adjacent pixel.

6. The method of claim 3, further comprising the step of:
calculating, for each pixel in that block, (i) the absolute difference between the value of that pixel and the value of its upper adjacent pixel, and (ii) the absolute difference between the value of that pixel and the value of its lower adjacent pixel, wherein the third condition is satisfied if both the difference in (i) and the difference in (ii) are each less than a predefined threshold, and the fourth condition is satisfied if one of the differences in (i) or (ii), but not both, is less than the predefined threshold.

7. The method of claim 5, wherein if the difference in (i) is greater than or equal to the predefined threshold but the difference in (ii) is less than the predefined threshold, that pixel is averaged with its lower adjacent pixel, and if the difference in (ii) is greater than or equal to the predefined threshold but the difference in (i) is less than the predefined threshold, that pixel is averaged with its upper adjacent pixel.

8. An apparatus for reducing ringing noise in a decompressed image, the apparatus comprising:
an input circuit configured to receive reconstructed frame blocks of the decompressed image; and
processing circuitry configured to
selectively perform, for each reconstructed frame block, a first type of filtering on each pixel of that reconstructed frame block based on certain relationships between that pixel and its left and right adjacent pixels, wherein, for each pixel of that block, a first filter is applied to perform the first type of filtering if a first condition is satisfied, a second filter is applied to perform the first type of filtering if the first condition is not satisfied but a second condition is satisfied, and selectively perform, for each reconstructed frame block, a second type of filtering on each pixel of that reconstructed frame block based on certain relationships between that pixel and its upper and lower adjacent pixels, wherein, for each pixel of that block, the first filter is applied to perform the second type of filtering if a third condition is satisfied, the second filter is applied to perform the second type of filtering if the third condition is not satisfied but a fourth condition is satisfied.

9. The apparatus of claim 8, wherein the first type of filtering comprises horizontal filtering and the second type of filtering comprises vertical filtering.

10. The apparatus of claim 9, wherein the first filter is a first low-pass filter and the second filter is a second low-pass filter, the first and second low-pass filters having a different number of taps.

11. The apparatus of claim 10, wherein the processing circuitry is further configured to:
calculate, for each pixel in that block, (i) the absolute difference between the value of that pixel and the value of its left adjacent pixel, and (ii) the absolute difference between the value of that pixel and the value of its right adjacent pixel, wherein the first condition is satisfied if both the difference in (i) and the difference in (ii) are each less than a predefined threshold, and the second condition is satisfied if one of the differences in (i) or (ii), but not both, is less than the predefined threshold.

12. The apparatus of claim 11, wherein, if the difference in (i) is greater than or equal to the predefined threshold but the difference in (ii) is less than the predefined threshold, that pixel is averaged with its right adjacent pixel, and if the difference in (ii) is greater than or equal to the predefined threshold but the difference in (i) is less than the predefined threshold, that pixel is averaged with its left adjacent pixel.

13. The apparatus of claim 10, wherein the processing circuitry is further configured to:
calculate, for each pixel in that block, (i) the absolute difference between the value of that pixel and the value of its upper adjacent pixel, and (ii) the absolute difference between the value of that pixel and the value of its lower adjacent pixel, wherein the third condition is satisfied if both the difference in (i) and the difference in (ii) are each less than a predefined threshold, and the fourth condition is satisfied if one of the differences in (i) or (ii), but not both, is less than the predefined threshold.

14. The apparatus of claim 13, wherein if the difference in (i) is greater than or equal to the predefined threshold but the difference in (ii) is less than the predefined threshold, that pixel is averaged with its lower adjacent pixel, and if the difference in (ii) is greater than or equal to the predefined threshold but the difference in (i) is less than the predefined threshold, that pixel is averaged with its upper adjacent pixel.

15. A machine-readable medium having a program of instructions for directing a machine to perform a process of reducing ringing noise in a decompressed image, the program of instructions comprising:
instructions for obtaining reconstructed frame blocks of the decompressed image;
instructions for selectively performing, for each reconstructed frame block, a first type of filtering on each pixel of that reconstructed frame block based on certain relationships between that pixel and its left and right adjacent pixels, wherein, for each pixel of that block, a first filter is applied to perform the first type of filtering if a first condition is satisfied, a second filter is applied to perform the first type of filtering if the first condition is not satisfied but a second condition is satisfied; and instructions for selectively performing, for each reconstructed frame block, a second type of filtering on each pixel of that reconstructed frame block based on certain relationships between that pixel and its upper and lower adjacent pixels, wherein, for each pixel of that block, the first filter is applied to perform the second type of filtering if a third condition is satisfied, the second filter is applied to perform the second type of filtering if the third condition is not satisfied but a fourth condition is satisfied.

16. The machine-readable medium of claim 15, wherein the first type of filtering comprises horizontal filtering and the second type of filtering comprises vertical filtering.

17. The machine-readable medium of claim 16, wherein the first filter is a first low-pass filter and the second filter is a second low-pass filter, the first and second low-pass filters having a different number of taps.

18. The machine-readable medium of claim 17, further comprising instructions for:

calculating, for each pixel in that block, (i) the absolute difference between the value of that pixel and the value of its left adjacent pixel, and (ii) the absolute difference between the value of that pixel and the value of its right adjacent pixel, wherein the first condition is satisfied if both the difference in (i) and the difference in (ii) are each less than a predefined threshold, and the second condition is satisfied if one of the differences in (i) or (ii), but not both, is less than the predefined threshold.

19. The machine-readable medium of claim 18, wherein, if the difference in (i) is greater than or equal to the predefined threshold but the difference in (ii) is less than the predefined threshold, that pixel is averaged with its right adjacent pixel, and if the difference in (ii) is greater than or equal to the predefined threshold but the difference in (i) is less than the predefined threshold, that pixel is averaged with its left adjacent pixel.

20. The machine-readable medium of claim 17, further comprising instructions for:

calculating, for each pixel in that block, (i) the absolute difference between the value of that pixel and the value of its upper adjacent pixel, and (ii) the absolute difference between the value of that pixel and the value of its lower adjacent pixel, wherein the third condition is satisfied if both the difference in (i) and the difference in (ii) are each less than a predefined threshold, and the fourth condition is satisfied if one of the differences in (i) or (ii), but not both, is less than the predefined threshold.

21. The machine-readable medium of claim 20, wherein if the difference in (i) is greater than or equal to the predefined threshold but the difference in (ii) is less than the predefined threshold, that pixel is averaged with its lower adjacent pixel, and if the difference in (ii) is greater than or equal to the predefined threshold but the difference in (i) is less than the predefined threshold, that pixel is averaged with its upper adjacent pixel.

* * * * *